United States Patent [19]

Okihara et al.

[11] Patent Number: 5,313,341
[45] Date of Patent: May 17, 1994

[54] DEVICE FOR PROCESSING FILE DATA WITH ERASING IDENTIFICATION DATA

[75] Inventors: Daijirou Okihara; Yukio Taniyama, both of Kanagawa, Japan

[73] Assignees: Sony Corporation, Tokyo; Fujitsu Limited, Kawasaki, both of Japan

[21] Appl. No.: 76,144

[22] Filed: Jun. 14, 1993

Related U.S. Application Data

[63] Continuation of Ser. No. 966,884, Oct. 27, 1992, abandoned.

[30] Foreign Application Priority Data

Oct. 31, 1991 [JP] Japan .................... 3-313512

[51] Int. Cl.$^5$ .................... G11B 5/09; G11B 20/14; G11B 20/16
[52] U.S. Cl. .................... 360/48; 360/40
[58] Field of Search .................... 360/48, 51, 53, 77.14, 360/25, 26, 40, 46

[56] References Cited

U.S. PATENT DOCUMENTS

| | | | |
|---|---|---|---|
| 3,765,005 | 10/1993 | Cannon | 360/48 X |
| 3,778,787 | 12/1973 | Cannon | 360/53 X |
| 4,841,390 | 6/1989 | Yokosawa | 360/51 X |
| 5,134,529 | 7/1992 | Inazawa et al. | 360/40 X |

FOREIGN PATENT DOCUMENTS

| | | |
|---|---|---|
| 0203797 | 12/1986 | European Pat. Off. . |
| 0272130 | 6/1988 | European Pat. Off. . |
| 0321077 | 6/1989 | European Pat. Off. . |
| 0386362 | 9/1990 | European Pat. Off. . |

OTHER PUBLICATIONS

Neues Aud Der Technik No. 1, 15 Feb. 1990, Wurzburg, DE p. 1, XP000105545 'Das Aktualisieren des Inhaltsverzeichnisses auf dem Aufzeichnungtrager in einem DAT-Spieler' right column, last paragraph.

*Primary Examiner*—Donald Hajec
*Assistant Examiner*—Patrick Wamsley
*Attorney, Agent, or Firm*—William S. Frommer; Alvin Sinderbrand

[57] ABSTRACT

A data recording/reproducing device updates the identification data for identifying the recording data of recording track on the magnetic tape as the meaningless data. As a result, in a data recording reproducing device to be used for, such as an external memory device of the computer, the desired data can be erased easily.

6 Claims, 8 Drawing Sheets

|  | 0 BYTE | 1 BYTE | 2 BYTE | 3 BYTE |
|---|---|---|---|---|
| 0 WORD | TRACK SET IDENTIFICATION DATA (HEAD DATA BLOCK) | | | |
| 1 WORD | TRACK SET IDENTIFICATION DATA (LAST DATA BLOCK) | | | |
| 2 WORD | LAST NUMBER OF FIT | | | |
| 3 WORD | WRITE RETRY FREQUENCY | | | |
| 4 WORD | | | | |
| ⋮ | | | | |
| 7 WORD | | | | |

FIG. 10

|  |  |
|---|---|
| 0 BYTE | TRACK CLASSIFICATION INFORMATION |
| 1 BYTE | |
| 2 BYTE | |
| ⋮ | |
| N BYTE | |

FIG. 11

DEVICE FOR PROCESSING FILE DATA WITH ERASING IDENTIFICATION DATA

This is a continuation of application Ser. No. 07/966,884, filed Oct. 27, 1992, now abandoned.

BACKGROUND OF THE INVENTION

1. Field of the Invention

The present invention relates to a data processing device, which is adapted to function as an external memory device of a computer, for example.

2. Description of the Prior Art

In a conventional data processing device, a data recorder, particularly an ID-1 format data recorder which forms helical recording tracks successively on the magnetic tape and is capable of recording and reproducing the desired data with high density, is proposed (ANSI×3.175–1990 19 mm Type ID-1 Recorded Instrumentation).

Figure 1:
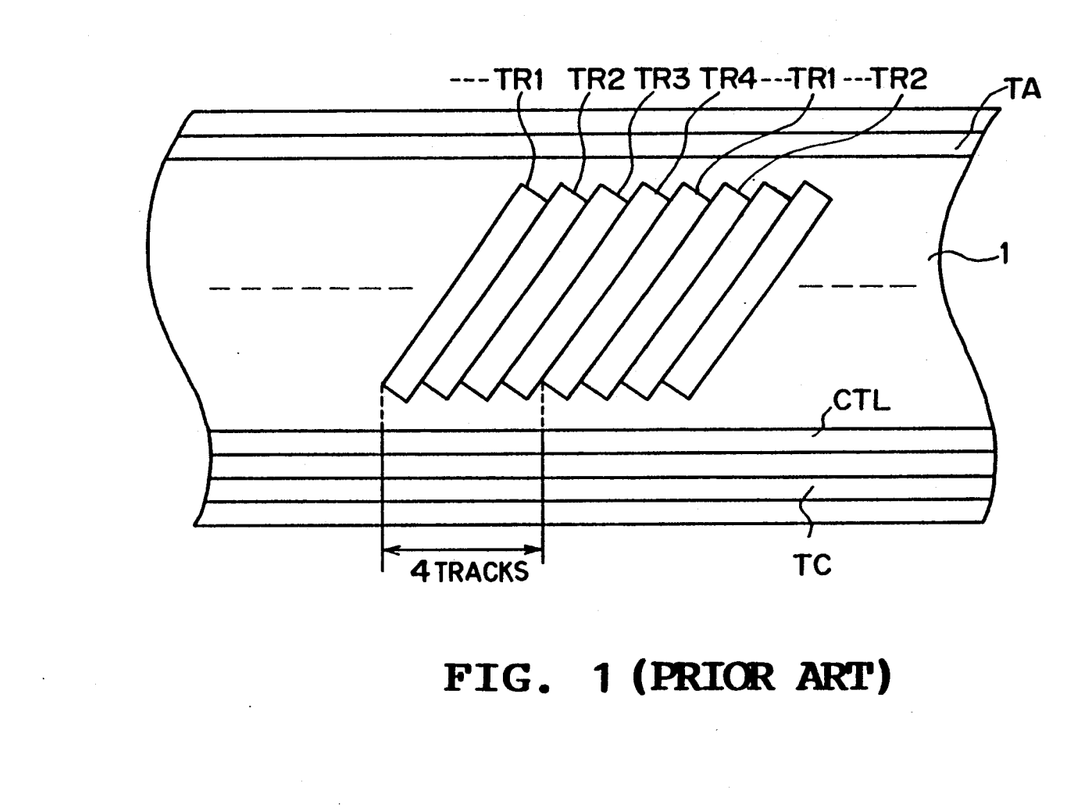
FIG. 1 is a schematic diagram illustrating a D-1 format.

More specifically, as shown in FIG. 1, in this type of data recorder, a magnetic tape 1 is rolled up on a rotary drum which is rotating with the prescribed speed and thereby running said magnetic tape 1 with the prescribed speed, and a magnetic head mounted on the rotary drum forms successively helical recording tracks TR (TR1, TR2, TR3, TR4, TR1, TR2, ...) and thus, records the desired data on said recording track TR.

Furthermore, in this event, the data recorder forms recording tracks TA, CTL and TC, which extend in a longitudinal direction of upper and lower sides of the magnetic tape 1 and records a track set identification (ID) data of the recording track TR on said recording track CTL.

The track set ID data which is composed of the absolute position information starting from the head of said magnetic tape is placed between prescribed synchronizing signals and recorded per four tracks cycle in regard to the recording track TR.

Furthermore, the recording tracks TA and TC are arranged to be able to record the user control data, and thereby reproducing the recording tracks TA, CTL and TC, the data recorded on the recording track TR with high density can be searched easily.

Furthermore, in the data recorder, in the case of recording the data on the recording track TR, the data are recorded adding parity codes for error detection correction consisted of product codes, and accordingly, the desired data can be recorded and reproduced with certainty.

Figure 2:
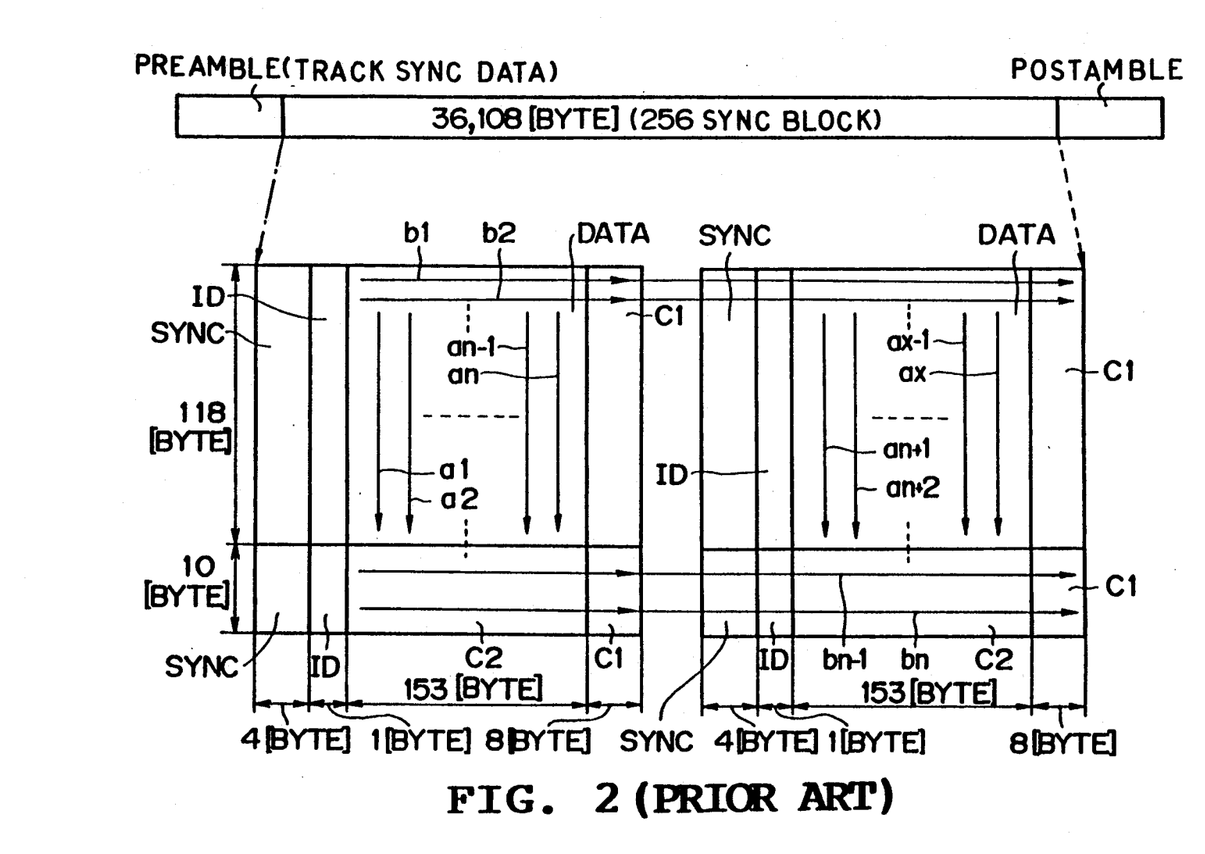
FIG. 2 is a schematic diagram illustrating an interleave processing.

More specifically, as shown in FIG. 2, the data recorder after inputting the data DATA with the prescribed unit (=36,108 [BYTE]), divides the data DATA into 306 blocks and adds the error detection correction code (i.e., consisted of C2 code) of Reed-Solomon to each block respectively.

Furthermore, after dividing each block into the first and the second fields, FIELD0 and FIELD1, the error detection correction codes of Reed-Solomon (i.e., consisted of C1 code) are added to each field, FIELD0 and FIELD1, crossing the C2 codes at right angles respectively.

With this arrangement, the reproducing data in the data recorder are error corrected in reproducing, using the C1 and C2 codes, so that the bit error rate can be improved.

Moreover, in the data recorder, in case of recording the data DATA added the C1 and C2 codes on the magnetic tape, each recording track TR is interleave processed and thus, even if the dropout occurs, the data DATA can be reproduced with certainty.

More specifically, in the data recorder, whereas the data DATA to be inputted in the order as marked with arrow marks a1, a2, ..., an−1, an, an+1, an+2, ax−1, ax, the data DATA are recorded shifting the input order as shown with arrow marks b1, b2, ..., bn−1, bn, and thus, said data DATA will be interleave processed.

Furthermore, in the data recorder, the synchronizing signal SYNC and sync bloc)( data ID are added to each prescribed unit (hereinafter referred to a sync block) and also preamble and postamble data are added as a whole, then the data DATA are recorded.

With this arrangement, in reproducing, in the magnetic recording device, the synchronizing signal SYNC, sync block data ID, and data DATA are reproduced referring to the track sync data contained in the preamble, and the synchronizing signal SYNC and the sync block data ID, are deinterleave processed i.e. the process of interleaving is reversed.

Furthermore, even in the case if the dropout occurs, the concentration of errors upon one place beyond error correction capacity of the C1 and C2 can be effectively avoided by deinterleave processing.

Then, in the ID-1 format data recorder for recording and reproducing the desired data, an approximately $10^{-10}$ bit error rate which is acceptable for practical use as a data processing device for chiefly measuring, is guaranteed.

If this bit error rate can be improved up to $10^{-15}$, it is considered that the extremely important data can be deposited by applying it to the magnetic tape device of the computer system for use in, for example, bank use.

Accordingly, the usability of this type of data recorder would be improved and also an application field can be expanded.

In this case, concerning this type of data recorder, if the plural files would be recorded on one magnetic tape with high density recording, it is considered that the magnetic tape can be more easily controlled.

In this event, it is considered convenient, provided the only desired file can be erased easily.

As such an erasing method, it is considered that, e.g., an erasing head would be loaded on a rotary drum. of the data recorder. However, if an erasing head is loaded on the rotary drum, the construction over the rotary drum would become complicated accordingly.

SUMMARY OF THE INVENTION

In view of the foregoing, an object of this invention is to provide a data processing device capable of erasing the desired data easily.

To obviate such problems according to the present invention, in the data recording devices 12 and 13 for recording the prescribed file data D0 to be outputted from the file control device 11 on the helical recording tracks TR1, TR2, TR3 ... on the magnetic tape 1, the identification data TRID for identifying the recording data of recording tracks TR1, TR2, TR3 ... will be recorded on each recording track TR1, TR2, TR3, respectively, and by updating the identification data TRID to prescribed erasing identification data, shows the recording data of said recording tracks TR1, TR2, TR3 ... as meaningless data.

If the identification data TRID to identify the recording data of the recording tracks TR1, TR2, TR3 ... would be updated to the erasing identification data and shows that the recording data of said recording tracks TR1, TR2, TR3 . . . are meaningless data, said identification data TRID can be updated and said recording data TR1, TR2, TR3 . . . can be easily erased.

According to the present invention, by updating the identification data for identifying the recording data on the recording track to the prescribed erasing identification data and representing the recording data of said recording track as being meaningless data in said erasing identification data, the reproducing function referring to said erasing identification data is stop controlled and the same effects as those of the data on the recording track are erased can be actualized, and accordingly the data recording reproducing device which is capable of erasing the desired data can be easily obtained.

The nature, principle and utility of the invention will become more apparent from the following detailed description when read in conjunction with the accompanying drawings in which like parts are designated by like reference numerals or characters.

DETAILED DESCRIPTION OF THE INVENTION

Preferred embodiments of the present invention will be described with reference to the accompanying drawings:

GENERAL CONSTRUCTION (1) Construction of Computer System

Figure 3:
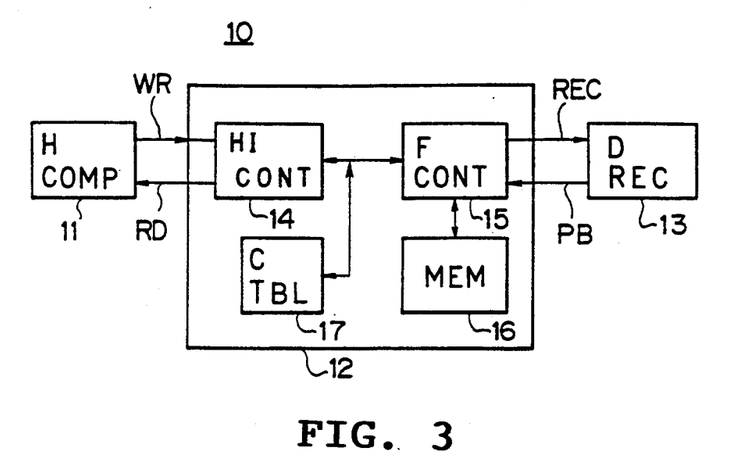
FIG. 3 is a block diagram showing a computer system according to one embodiment of the present invention.

Designated generally at 10 in FIG. 3, is a brief construction of a computer system applied the present invention. The write-in data WR outputted from a host computer 11 with a write-in demand, will be supplied to a data recorder 13 of the ID-1 format as recording data REC via a data recorder control device 12, and thus the write-in data WR will be written in the recording track on the magnetic tape.

The magnetic tape of the data recorder 13 is reproduced corresponding to the read-out demand inputted from the host computer 11, and the resultant reproducing data will be inputted to the host computer 11 as the read-out data RD via the data recorder control device 12.

This data recorder control device 12 is constituted by a host interface control unit 14 and a format control unit 15, and the host interface control unit 14 controls the channel interface between the host computer 11 and the format control unit 15 formats the data to be given to the data recorder 13 using a memory 16.

The control information between the host interface control unit 14 and the format control unit 15 will be given referring to a control table 17.

Thus, since the data recorder control device 12 is set up in the computer system 10, the data recorder 13 can be used as an outside memory device of the host computer 11 with the identical interface with the conventional magnetic tape device.

(2) Recording Area on the Magnetic Tape

Figure 4A:
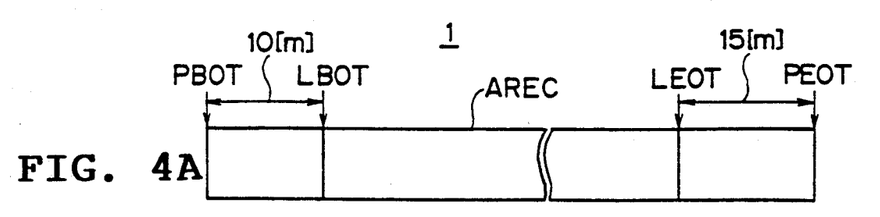
FIGS. 4A and 4B are schematic diagrams showing recording areas on the magnetic tape.
Figure 4B:
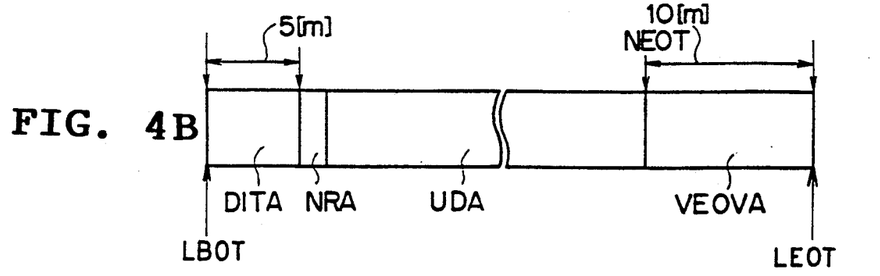

Hence, in this computer system 10, as shown in FIGS. 4A and 4B, seeing in a longitudinal direction, the center part of the tape where errors on the tape are comparatively small, will be used as a recording area AREC and thus the bit error rate can be improved.

More particularly, as shown in FIG. 4A, as well as assigning the position, e.g., 10 [m] behind from the physical point PBOT of the magnetic tape as the logical point LBOT, the position, e.g., 15 [m] ahead from the physical end PEOT of the magnetic tape 1 is assigned as the logical end LEOT, and an area from the logical point LBOT to the logical end LEOT will be used as a recording area AREC.

In this recording area AREC, as shown in FIG. 4B, an area from the logical head point LBOT to e.g., 10 [m] behind will be used as a directory information track area DITA.

Followed by this directory information track area DITA, having the prescribed length non-recording area NRA between, an area to the nearly end NEOT, the point e.g., 15 [m] ahead from the logical end LEOT, will be used as the user recording track area UDA; furthermore an area from the nearly end NEOT to the logical end LEOT will be used as the volume end information area VEOVA.

(3) Format of the Recording Track

Figure 5A:
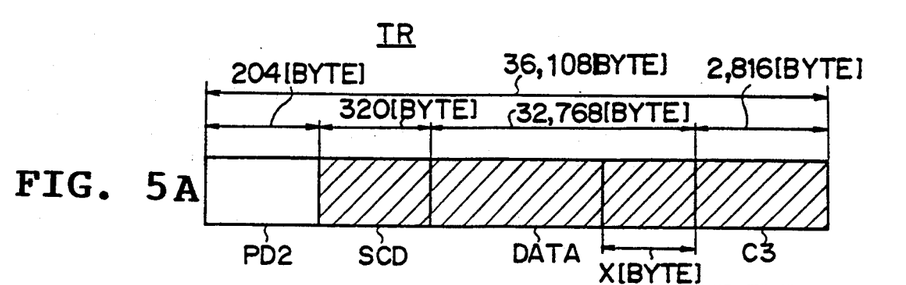
FIGS. 5A and 5B are schematic diagrams showing a recording format on the magnetic tape.
Figure 5B:
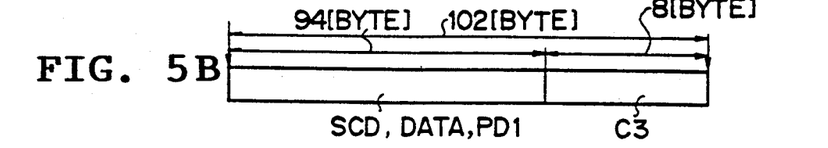

Here, in this computer system 10, as well as formatting the user data area of 36,108 [BYTE] per one recording track required by the ID-1 format as shown in FIGS. 5A and 5B, the data being format processed will be interleave processed per four tracks unit, and thus the bit error rate can be improved.

FIG. 5A conceptually shows the kinds and length of information contained in one track, and FIG. 5B is a definite example of the C3 error correction block before it is ID-1 formatting processed.

More specifically, in the computer system 10, as shown in FIG. 5A, the write-in data WR from the host computer 11 will be recorded as the 32,768 [BYTE] recording data DATA, comprising one block per one recording track TR as four tracks per unit, for example.

In this event, concerning the recording data DATA having less than 32,768 [BYTE] as per one recording track TR, the first supplementary data PD1 is added and thus makes to 32,768 (BYTE) as a whole. And the sub-code data SCD for 320 [BYTE] are provided to store the supplementary information of this one recording track TR.

In addition to the above, as shown in FIG. 5B, the data recorder control device 12 is added the 8 [BYTE] Reed-Solomon error detection correction code (hereinafter referred to the C3 code C3 according to the C1 and C2 codes in ID-1 format) using the prescribed generative polynomial in every 94 [BYTE] of the sub-code data SCD, the recording data DATA of the first supplementary DATA PD1; and thus, the error correction can be more forcefully executed, and thereby the bit error rate can be remarkably improved.

Figure 6:
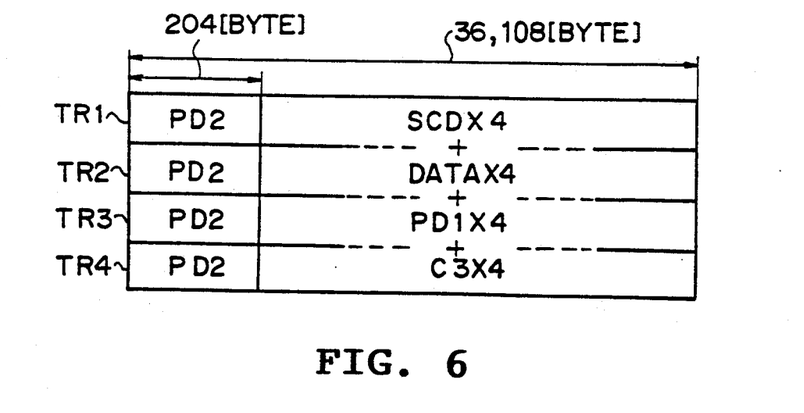
FIG. 6 is a schematic diagram showing an interleave processing between recording tracks.

As shown in FIG. 6, regarding the sub-code data SCD, the recording data DATA, the first supplementary data PD1, which are formatting processed as one recording track per unit, the data for four recording tracks TR1, TR2, TR3 and TR4 are interleave processed covering between tracks with the prescribed method, and thereby the bit error rate can be further improved.

With this arrangement, the 204 [BYTE] second supplementary data PD2 are added at the head of data for each one recording track interleave processed for four recording tracks TR1, TR2, TR3 and TR4, and thus, as a whole, the quantity of data for one recording track TR will become 36,108 [BYTE] as regulated by the ID-1 format.

Since the second supplementary data PD2 are formatted at the head, said supplementary data PD2 can be applied to the projected part of the magnetic head where the degree of damage of the magnetic tape 1 in the recording tracks is high and tracking is unstable; and thus, the bit error rate can be further improved regarding the recording data DATA.

(4) Layout of the Recording Track

In case of the computer system 10, the supplementary information of the recording track 1 to be stored in the sub-code data SCD is constituted by the track classification information TRID to show classification for the recording track TR, the block number BLNO which the recording track TR belongs to, the file number FLNO which the recording track TR belongs to, write retry frequency RTCT for the recording track TR, and the number of byte BYCT contained in the recording track.

In this track classification information TRID, the classification information of the volume information table VIT, the file information table FIT, the updating information table UIT, the dummy data track information DMY, the user data track information UDT, and the tape mark track information TM or the recording end information EOR will be recorded.

Figure 7:
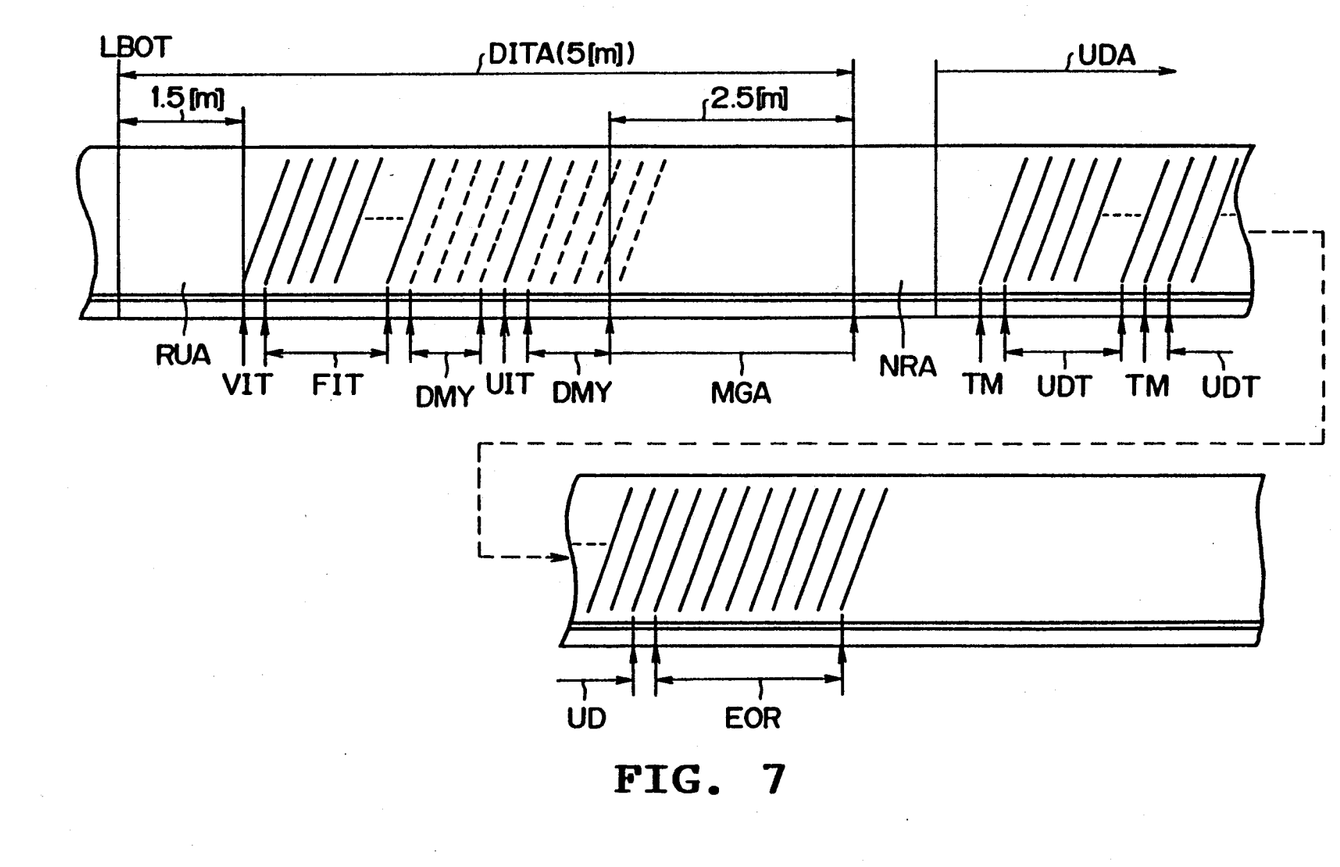
FIG. 7 is a schematic diagram showing a track format on the magnetic tape.

Here, practically as shown in FIG. 7, the volume information table VIT, the file information table FIT, the updating information table UIT or the dummy data track information DMY will be used as the track classification information TRID of the recording track TR, formed in the directory information track area DITA of the magnetic tape 1.

In this directory information track area DITA, the directory information table DIT to control files on the magnetic tape 1 will be recorded as a whole; and followed by the starting area RUA, 1.5 [m] from the logical point LBOT of the magnetic tape 1, the recording track consisted of the volume information table VIT will be recorded per four tracks comprising track set.

In the recording data DATA of this volume information table VIT, the head and the last position information of the data block recorded in the user recording track area UDA making the overall magnetic tape 1 as one volume, length information of the file information table FIT, and block number of the data block executed the write retry at the time of recording will be recorded.

Further, the file information table FIT is recorded on the 256 recording track which is followed by the volume information table VIT. And in the recording data of this file information table FIT, the head position information and the block length of said file will be recorded as per file unit recorded in the user recording track area UDA.

Furthermore, followed by the file information table FIT, the dummy data track information DMY will be recorded with the prescribed number of tracks and the updating information table UIT will be recorded for the next four recording tracks. In the recording data DATA of this updating information table UIT, an information to show whether there is any updating or not will be recorded.

Moreover, followed by this updating information table UIT, the dummy data track information DMY will be recorded on the recording track TR for 2.5 [m] from the head of directory information track area DITA, and directory information track area DITA for the remaining 2.5 [m] will be reserved as a marginal area MGA.

Then, followed by the directory information track area DITA of the magnetic tape 1, having a non recording area NRA between, the user data track information UDA, tape mark track information TM or the recording end information EOR will be used as the track classification information TRID formed in the user recording track area UDA.

The recording track TR of this user recording track area UDA placed between the recording tracks TR of the tape mark track information TM consisted for four tracks per unit, the recording track TR of the user data track information UDT for a plurality of blocks which constitute one file will be recorded and followed by the end of user data track information UDA, the recording track TR of recording end information EOR will be recorded.

The first supplementary data PD1 for 32,768 [BYTE] are recorded on the recording data DATA of the tape mark track information TM and recording end information EOR and the data in accordance with the write-in data WA inputted from the host computer are recorded on the recording data DATA of the recording track TR of the user recording track area UDA.

Accordingly, in the computer system 10, the directory information track area DITA is set up at the head of magnetic tape 1, and by controlling the content of user recording track area UDA per file unit, the data recorded on the data recorder 13 can be accessible as well as an outer recording device referring to the host computer 11.

(5) Construction of Recording Format in the Format Control Unit

Figure 8:
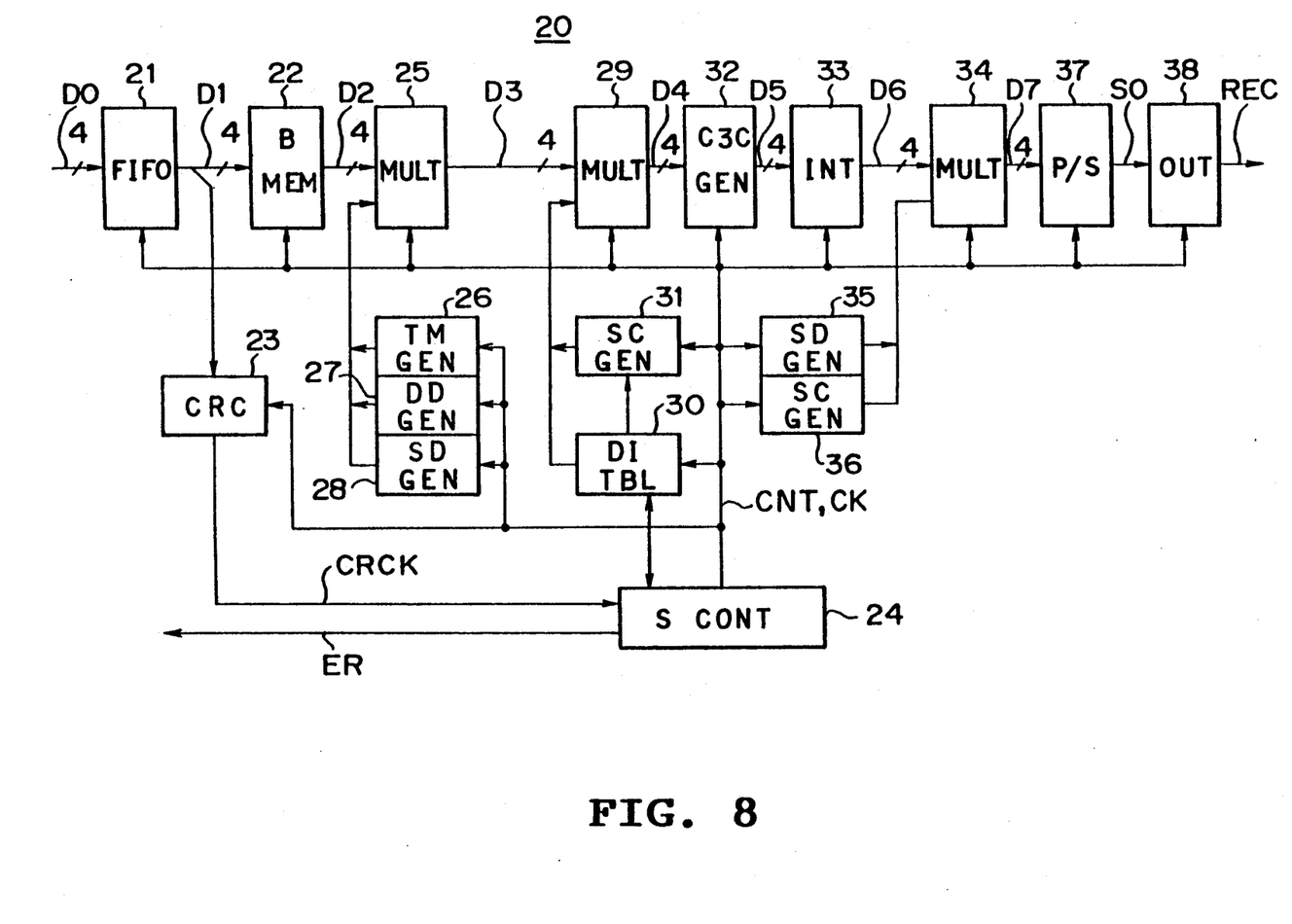
FIG. 8 is a block diagram showing a recording format control unit.
Figure 9:
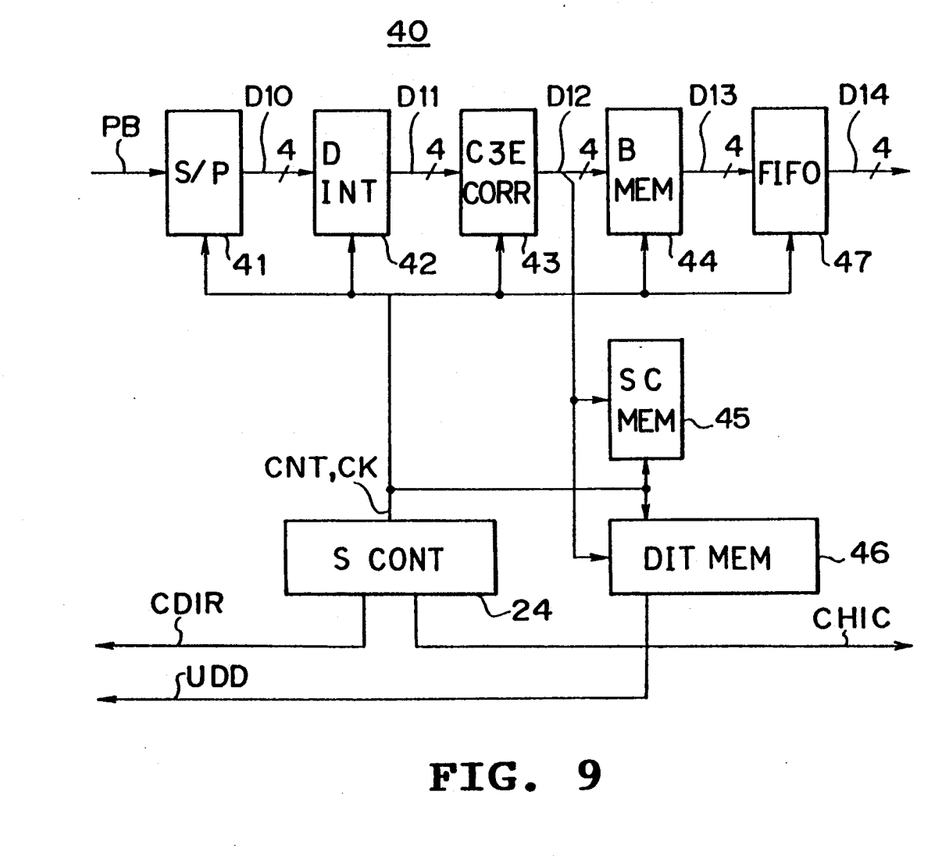
FIG. 9 is a block diagram showing a reproducing format control unit.

A format control unit 15, as well as a memory 16, of the data recorder control system 12 in the computer system 10 are constituted by the recording format unit 20 and reproducing format unit 40 as shown in FIG. 8 and FIG. 9.

More specifically, in the recording format control unit 20, by inputting the data every 32 bits from the host interface control unit 14 to a memory circuit 21 consisting of FIFO (i.e., first in first out memory), as the 4-channel 8 bit parallel write-in data D0, said write-in data D0 will be synchronized with the internal clock CK, and as well as writing in the buffer memory 22 as an input data D1, outputs to a CRC error detection circuit 23.

Whereas the write-in data D0 in the recording format control unit 20 is processed every four channels, the explanation of this recording format control unit 20 will be done for one channel data.

A CRC error detection circuit 23 detects error using CRC (cyclic redundancy code) regarding the input data D1 to derive the detected result CRCK thereof, to the computer constituted system control circuit 24 which comprises the CPU.

The system control circuit 24 detects error of the input data D1 depending on the detection result CRCK of the CRC error detection circuit 23, and returns this to the host interface control unit 14 as an error detection signal ER.

As a result, for example, the host interface control unit 14 will execute a retransfer processing in regards to the write-in data D0 having errors.

A buffer memory 22, as discussed above in FIGS. 5A and 5B, buffering processed for one recording track TR regarding the input data D1, and outputs the first buffer data D2 to the first multiplexer 25 depending on the resultant recording data DATA.

In addition to the first buffer data D2, the first supplementary data PD1 for the tape mark track information TM to be output-ted from a tape mark generating circuit 26, dummy data for the dummy data track information DMY to be outputted from the dummy data generation circuit 27, and the first supplementary data PD1 for recording data DATA to be outputted from the supplementary data generation circuit 28 are supplied to this first multiplexer 25.

With this arrangement, the first multiplexer 25 depending on the control signal CNT to be inputted from a control circuit 24 and adding the first supplementary data PD1 to the recording data DATA of the first buffer data D2, generates the second buffer data D3 and thereby outputs to the second multiplexer 29.

The directory information table DIT to be outputted from the directory information table memory 30, and the sub-code data SDC generated at a sub-code generation circuit 31 depending on the content of the directory information table 30 are inputted to this second multiplexer 29, in addition to the second buffer data D3.

Practically, as described above regarding FIG. 7 the directory information table DIT is stored in the directory information table memory 30, and according to the content of the directory information table DIT, the sub-code generation circuit 31 generates the first and last position information of the data block, lengths information of the file information table FIT, and the block numbers of the data block executed the write retry at the time of recording.

Thus, the second multiplexer 25 adds the sub-code data SCD to the second buffer data D3 depending on the control signal CNT to be inputted from the system control circuit 24 so as to form the format as described above concerning FIGS. 5A and 5B and thereby output to the C3 code generation circuit 32 as the third buffer data D4.

As described above regarding FIGS. 5A and 5B, the C3 code generation circuit 32 generates the 8 [BYTE] C3 code C3 and adds to the third buffer data D4, then outputs the resultant recording track data D5 to the interleave circuit 33.

The interleave circuit 33 inputs the recording track data D5 for four tracks successively into the interleave memory and outputs them with the prescribed sequence to execute interleave processing for four tracks as shown in FIG. 6, and output the resultant second recording track data D6 to the third multiplexer 34.

In addition to the second recording track data D6, the second supplementary data PD2 to be outputted from the second supplementary data generation circuit 35, and the synchronized code data to be outputted from the synchronized code generating circuit 36 are supplied into this third multiplexer 34.

With this arrangement, the third multiplexer 34 adds the second supplementary data PD2 and the synchronized code data to the second recording track data D6 depending upon the control signal CNT to be inputted from the system control circuit 24, and outputs the resultant third recording track data D7 to the parallel serial converter 37.

The parallel serial converter 37 converts the third recording track data D7 which is formed of 8 bit parallel of 4 channels into the serial recording data SO for 32 bits, and thereby inputs in the data recorder 13 as the recording data REC via the output circuit 38.

Thus, in the recording format control unit 20 of the format control unit 15, regarding the write-in data D0 to be inputted from the host interface control unit 14, generates the recording data REC executing the format processing as explained above in FIG. 5 to FIG. 7, and records on the magnetic tape 1 depending upon the ID-1 format as shown in FIG. 1 and FIG. 2.

(6) Construction of Reproducing Format Unit in the Format Control Unit

Here, as shown in FIG. 9, in the reproducing format control unit 40, the serial reproducing data PB reproduced at the data recorder 13 is inputted to the serial parallel converter 41 and is converted into the first reproducing data D10 formed of 8-bit parallel of four channels every 32 bits, and inputted into the deinterleave circuit 42.

The deinterleave circuit 42 receives the first reproducing data D10 in the same way as the interleave circuit 33 of the recording format control unit 20, and outputs them with the prescribed sequence to execute deinterleave processing corresponding to the interleave processing of the interleave circuit 33, and input the resultant second reproducing data D11 into the C3 error correction circuit 43.

The C3 error correction circuit 43, in utilizing the C3 code C3 added at the C3 code generation circuit 32 of the recording format unit 20, executes error correction processing concerning the second reproducing data D11 and derives the resultant third reproducing data D12.

As a matter of fact, among the third reproducing data D12, the ones corresponded to the user recording data track UDT, as shown in FIG. 7, are supplied to the buffer memory 44 and the ones corresponded to the directory information table DIT are inputted to the sub-code memory 45 and directory information table memory 46.

The buffer memory 44 takes out the first supplementary data PD1 contained in the third reproducing data D12 and inputs it to the memory circuit 47 as the fourth reproducing data D13, which is outputted to the host interface control unit 14 as the read-out data D14 to be outputted from the reproducing format control unit 40 synchronizing with the external clock.

Furthermore, in the case if there is any updating in the directory information table DIT inputted into the directory information table memory 46, the system control circuit 24 outputs the updating information UDD of the directory information table DIT to the data recorder 13 along with the data recorder control signal CDIR to update the content of the directory information table DIT of the magnetic tape 1.

Further the system control circuit 24, along with the output data D14, outputs an answer to the data reproducing demand inputted from the host interface control unit 14 as the control signal CHIC, to the host interface control unit 14.

Hence, in-the reproducing format control unit 20 of the format control unit 15, regarding the reproducing data PB reproduced at the data recorder 13, an inverse format processing of said format processing is executed to generate the read-out data D14, which is then outputted to the host interface control unit 14.

DATA MANAGEMENT

In the supplementary information for recording on the directory information track area DITA, the data regarding the whole recordings of said magnetic tape 1 are stored in the volume information table VIT.

Figure 10:
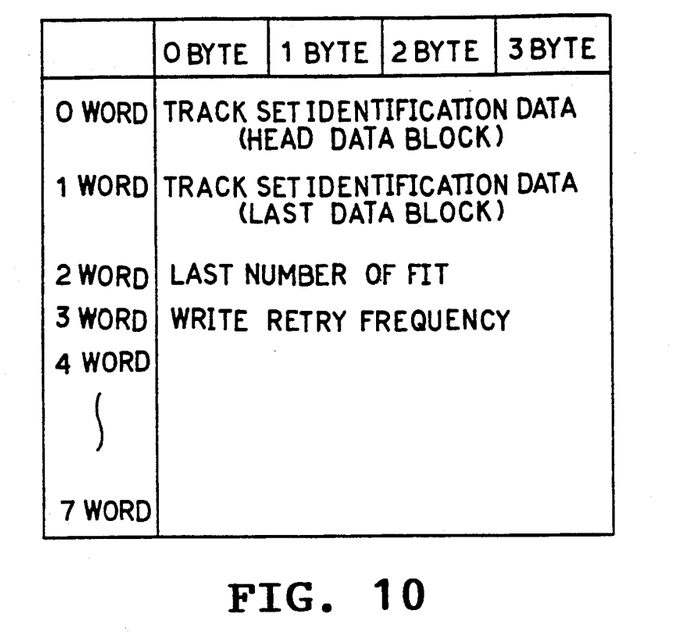
FIG. 10 is a schematic diagram showing a volume information table.

More specifically, as shown in FIG. 10, in the volume information table VIT, the track set identification data (equivalent to the recording data of the recording track TCL in FIG. 1) is recorded regarding the data block recorded at the head of said magnetic tape 1 and the last data block, and subsequently, the last number of file information table FIT and the write retry frequency are recorded.

Corresponding to the above, in the volume information table VIT, the track classification information TRID to show that the recording track belong to said volume information table VIT is recorded on the head byte of sub-code data and subsequently, a necessary supplementary information is recorded.

Corresponding to the above, in the tape mark track TM which is formed at the head of each file, after the tape mark identification data is recorded as the track classification information TRID, the block number and track number of said tape mark track are recorded as the sub-code data.

Figure 11:
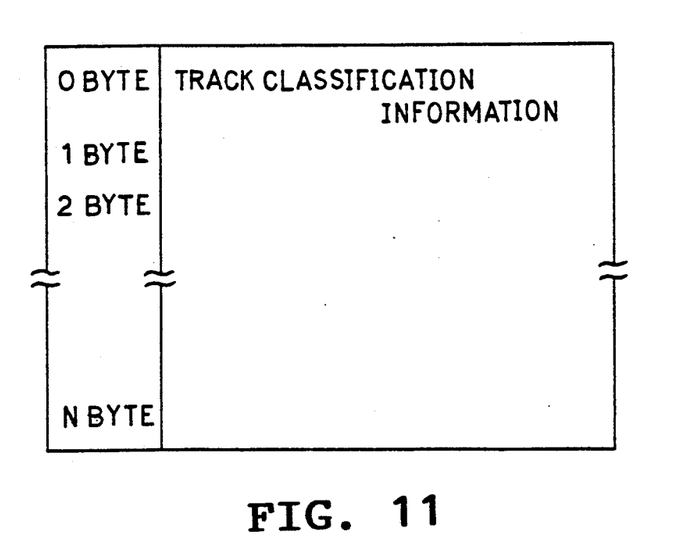
FIG. 11 is a schematic diagram explaining a subcode.

Furthermore, followed by said tape mark track TM, the user recording track in which the user actually records, as shown in FIG. 11, the track classification information TRID to show that it is the user recording track will be recorded.

Thus, the system control circuit 24, when forming the recording track TR successively, detects the last data block of the volume information table VIT at the beginning, and upon fast forwarding to the position of said last data block, subsequently forms the tape mark track TM and user recording track.

At this point, the system control circuit 24 controls the subcode generation circuit 31 and sets up the track classification information TRID corresponding to the type of each recording track.

Furthermore, when the recording of the file is finished, the system control circuit 24 upon rewinding the magnetic tape 1, updates the track set identification data of the last data block of the volume information table VIT, the last number of file information table FIT and the file information table FIT itself, and completes its function.

With this arrangement, in the system control circuit 24, according to the supplementary information at the head of magnetic tape, the desired file can be easily accessible.

On the other hand, when the erasing command is inputted, the system control circuit 24 actuates the subcode generation circuit 31 and thus generates the subcode data.

With this arrangement, the system control circuit 24 generates the track classification information TRID in which the logical value "1" continues, and double records the track classification information TRID over the recording track to be erased.

Furthermore, the system control circuit 24, in utilizing the function of read after write of the data recorder 13, inputs the sub-code data double recorded from the reproducing data of said data recorder 13 into the sub-code memory 45 and thus confirms whether the track classification information TRID is certainly recorded or not.

Here, in the case if it is judged that the track classification information TRID is not recorded correctly, the system control circuit 24 outputs the control signal to the data recorder 13 and repeats the retry.

With this arrangement, the system control circuit 24 detects the track classification information TRID at the time of reproducing, and if the logical value "1" continues, it judges that the recording track as recorded the meaningless data, and stop controls the output of the reproducing data D14.

Thus, in this embodiment, the data recorder control device 12 applies the track classification information TRID wherein the logical value "1" continues to the erasing identification data and when said erasing identification data is recorded, stop controls the reproducing function.

With this arrangement, since the data recorder control device 12 is capable of stop controlling the output of the recording data D14 merely by updating the track classification information TRID to the erasing identification data, the same effect as the data of the recording track is erased can be obtained.

Accordingly, without setting the erasing head, the desired data can be easily erased by only updating the track classification information TRID.

Furthermore, at this point, in the data recorder control device, the recording data can always be added to the unrecorded area by updating the volume information table VIT only when forming the recording track TR in regards to the recording function after erased, and thus, the bit error rate can be improved.

EFFECTS OF THE EMBODIMENTS

According to the foregoing construction, in case of reproducing the recording data depending upon the track classification information TRID, the same effect as the data of the recording track are erased can be obtained by updating the track classification information TRID to the erasing identification data and setting to the recording track recorded meaningless data, and accordingly the desired data can be erased easily.

OTHER EMBODIMENTS

The embodiment discussed above has dealt with the case of setting up the track classification information TRID wherein the logical value "1" continues to the erasing identification data. The present invention is not, however, limited to the above, but also is capable of setting various data to the erasing identification data as occasion demands.

Furthermore, the embodiment discussed above has dealt with the case of stop controlling the reproducing data of said recording track when the track classification information TRID is set to the erasing identification data. However, the present invention is not only limited to the above, but also it may be arranged to stop control the output of recording data after the recording track followed by the files when the track classification information TRID is set to the erasing identification data.

With this arrangement the data recorded on a plurality of recording tracks can be erased with only one scanning and accordingly the time required for erasing can be shortened.

Furthermore, in this case, the track classification information of the tape mark TM may be set to the erasing identification data and it may be erased per file unit.

Furthermore, the embodiment discussed above has dealt with the case of postscripting the recording. The present invention is not, however, limited to the above, but also applied to the case of recording the data over the area erased.

In this case, the track set ID of the volume information table VIT (i.e., consists of the track set to show the last data block) may be updated as well as setting the track classification information TRID to the erasing identification data.

Moreover, the embodiment discussed above has dealt with the case of applying the present invention to the data recorder of D-1 format. However, the present invention is not only limited to the above, but also suitable for wide application to the magnetic tape recording reproducing devices wherein recorded various data.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A device for processing prescribed file data for serial recording in a plurality of file data helical recording tracks on a magnetic tape, comprising:
   first recording means for recording identification data in each of said file data helical recording tracks for identifying the file data recorded in said file data recording track; and
   first updating means for selectively updating said identification data in a file data recording track with erasing identification data in response to an external erasing command, whereby said erasing identification data indicates that the file data in said file data recording track is meaningless data.

2. The device according to claim 1, wherein said identification data recorded on each said file data recording track, comprises track classification information which includes tape mark identification data representing a head track of a set of file data recording tracks, number representing the number of said file data recording track and user recording track identification data representing the file data in said file data recording track.

3. The device according to claim 1, wherein:
   said erasing identification data for updating said identification data is binary data having a logical value "one".

4. The device according to claim 1, further comprising:
   reproducing means for reproducing said file data recorded in said file data recording tracks on said magnetic tape;
   detecting means coupled to said reproducing means for detecting the presence of said erasing identification data;
   supplying means for selectively supplying to a host device the reproduced file data only from said file data recording tracks in which said erasing identification data is undetected, whereby only said file data from said file data recording tracks which include said erasing identification data is disregarded as meaningless data.

5. The device according to claim 1, further comprising:
   second recording means for recording a volume information table at a beginning portion of said magnetic tape for providing track directory information regarding all recorded file data, said volume information table comprising track set identification data for identifying beginning and end positions of respective sets of said recorded file data, and data for identifying a position of a last recorded file data track; and
   second updating means for updating said volume information table when additional file data is recorded on the magnetic tape and when said first updating means updates said identification data with said erasing identification data.

6. A device for processing file data for serial recording in a plurality of helical file data recording tracks on a magnetic tape, comprising:
   recording means for recording identification data in each of said file data recording tracks for identifying the file data recorded in said file data recording track;
   updating means for selectively updating said identification data in a file data recording track with erasing identification data in response to an external erasing command, whereby the updated erasing identification data indicates that the file data in said file data recording track is meaningless data;
   reproducing means for reproducing said file data from said file data recording tracks on said magnetic tape;
   detecting means for detecting the presence of said erasing identification data in said reproduced file data recording tracks; and
   supplying means for selectively supplying to a host device said reproduced file data from successive file data recording tracks until said erasing identification data is detected, whereupon any file data subsequently reproduced from subsequent file data recording tracks is disregarded as meaningless data.

* * * * *